United States Patent
Gutiérrez Medina et al.

(10) Patent No.: US 10,621,704 B2
(45) Date of Patent: Apr. 14, 2020

(54) AUTOMATED QUANTITATIVE RESTORATION OF BRIGHT FIELD MICROSCOPY IMAGES

(71) Applicant: Instituto Potosino de Investigación Científica y Tecnológica A.C., San Luis Potosí (MX)

(72) Inventors: Braulio Gutiérrez Medina, San Luis Potosí (MX); Manuel de Jesús Sánchez Miranda, Puebla (MX); Carmen Noemí Hernández Candia, San Luis Potosí (MX)

(73) Assignee: Instituto Potosino de Investigación Cientifica y Tecnologica, San Luis Potosi (MX)

( * ) Notice: Subject to any disclaimer, the term of this patent is extended or adjusted under 35 U.S.C. 154(b) by 153 days.

(21) Appl. No.: 15/840,307

(22) Filed: Dec. 13, 2017

(65) Prior Publication Data
US 2019/0180420 A1 Jun. 13, 2019

(51) Int. Cl.
*G06T 5/00* (2006.01)
*G06T 7/557* (2017.01)
(Continued)

(52) U.S. Cl.
CPC ............ *G06T 5/003* (2013.01); *G06K 9/0014* (2013.01); *G06K 9/00134* (2013.01); *G06T 5/50* (2013.01);
(Continued)

(58) Field of Classification Search
None
See application file for complete search history.

(56) References Cited

U.S. PATENT DOCUMENTS 8,744,164 B2   6/2014 Ozinsky et al.
2010/0074486 A1*   3/2010 Broser ...................... G06T 5/50
382/128
(Continued)

FOREIGN PATENT DOCUMENTS

WO   WO2015168026   11/2015

OTHER PUBLICATIONS

M. Oberholzer, M. Ostreicher, H. Christen&M. Brühlmann, 1996"Methods in quantitative image analysis",Histochem. Cell Biol.,105, 333-55.
(Continued)

*Primary Examiner* — Leon Viet Q Nguyen
(74) *Attorney, Agent, or Firm* — Defillo & Associates, Inc.; Evelyn A. Defillo (57) ABSTRACT

The herein invention discloses and claims a quantitative image restoration in bright field (QRBF) method that faithfully recovers shape and enables quantify size of individual unstained samples. The QRBF method restores out-of-focus BF images of unstained samples by applying deconvolution, which enhances contrast and allows for quantitative analysis. To perform deconvolution our procedure uses a point spread function modeled from theory. Image deconvolution can be performed even from a single input image in two dimensions (2D-QRBF), and quantitative information such as size and shape of samples can be determined from restored 2D-QRBF images. Application of 2D-QRBF in a high-throughput screening process to assess shape changes in cells during hyperosmotic shock shows that the described digital restoration approach is suitable for quantitative analysis of unstained BF images in high-throughput image cytometry.

19 Claims, 5 Drawing Sheets

(51) Int. Cl.
G06K 9/00 (2006.01)
G06T 5/50 (2006.01)
G06T 7/10 (2017.01)
(52) U.S. Cl.
CPC ............ G06T 7/10 (2017.01); G06T 7/557 (2017.01); G06T 2207/10052 (2013.01); G06T 2207/10064 (2013.01)

(56) References Cited

U.S. PATENT DOCUMENTS

| 2015/0077583 | A1* | 3/2015 | Szapiel | G06T 5/003 348/222.1 |
| 2017/0052106 | A1 | 2/2017 | Hennig et al. | |
| 2018/0045622 | A1* | 2/2018 | Deisseroth | B01L 3/502 |

OTHER PUBLICATIONS

M. Tscherepanow, F. Zöllner, M. Hillebrand,&F. Kummert, 2008 "Automatic Segmentation of Unstained Living Cells in Bright-Field Microscope Images" in Advances in Mass Data Analysis of Images and Signals in Medicine, Biotechnology, Chemistry and Food Industry, Springer Berlin Heidelberg, 158-172.
J.C. Neto, U. Agero, R.T. Gazzinelli, O.N. Mesquita, 2006,"Measuring Optical and Mechanical Properties of a Living Cell with Defocusing Microscopy",Biophys. J.,91, 1108-1115.
S. Tse,L. Bradbury, J. W.L. Wan, H. Djambazian, R. Sladek, T. Hudson, 2009, "A combined watershed and level set method for segmentation of brightfield cell images", Proc. SPIE, 7259, Medical Imaging 2009: Image Processing, 72593G.
U. Agero, L.G. Mesquita, B.R.A. Neves, R.T. Gazzinelli, O.N. Mesquita, 2004,"Defocusing microscopy",Microsc. Res. Tech.,65, 159-165.
L. L. Drey, M.G. Graber, J. Bieschke, 2013,"Counting unstained, confluent cells by modified bright-field microscopy", Biotechniques, 55, 28-33.
Paul Held, Joe Clayton, and Peter Banks, 2016 "High Contrast Bright field Enabling Microplate-based Automated Label-free Cell Counting", BioTek:Tech Note.
F. Buggenthin, et al., 2013"An automatic method for robust and fast cell detection in bright field images from high-throughput microscopy", BMC Bioinformatics, 14, 297.
S.S. Gorthi, E. Schonbrun, 2012 "Phase imaging flow cytometry using a focus-stack collecting microscope",Opt. Lett.37, 707.

P. K. Poola, V. P. Pandiyan, R. John, 2015"Quantitative imaging of yeast cells using transport of intensity equation", IEEE in 2015 Workshop on Recent Advances in Photonics.
D. Paganin, A. Barty, P.J. McMahon, K.A. Nugent, 2004 "Quantitative phase-amplitude microscopy. III. The effects of noise", J. Microsc., 214, 51-61.
J. Selinummi,et al.2009, "Bright Field Microscopy as an Alternative to Whole Cell Fluorescence in Automated Analysis of Macrophage Images",PLoS One, 4, e7497.
U. Adiga, et al., 2012"Automated Analysis and Classification of Infected Macrophages Using Bright-Field Amplitude Contrast Data", J. Biomol. Screen., 17, 401-408).
P. J. Tadrous, 2010 ("A method of PSF generation for 3D brighffield deconvolution",J. Microsc., 237, 192-199.
T. J. Holmes, N.J. O'Connor, 2000 "Blind deconvolution of 3D transmitted light brightfield micrographs",J. Microsc.,200, 114-27.
C.N. Hernández Candia, B. Gutíerrez-Medina, 2014"Direct Imaging of Phase Objects Enables Conventional Deconvolution in Bright Field Light Microscopy",PLoS One,9, e89106.
B. Gutíerrez-Medina, S.M. Block, 2010"Visualizing individual microtubules by bright field microscopy", Am. J. Phys., 78, 1152-1159.
P. Scheie, 1969. "Plasmolysis of *Escherichia coli* B/r with Sucrose", J. Bacteriol. 98, 335-340.
M.C. Konopka, I.A. Shkel, S. Cayley, M.T. Record, J.C. Weisshaar. 2006. "Crowding and confinement effects on protein diffusion in vivo", J. Bacteriol.188, 6115-6123.
H. Schwarz, A.L. Kocht, 1995,"Phase and electron microscopic observations of osmotically induced wrinkling and the role of endocytotic vesicles in the plasmolysis of the Gram-negative cell wall", Microbiology141, 3161-3170.
T. Pilizota, J.W.Shaevitz, 2013, "Plasmolysis and Cell Shape Depend on Solute Outer-Membrane Permeability during Hyperosmotic Shock in *E coli*", Biophys. J.104, 2733-2742.
Singer, W., M. Totzeck, and H. Gross. 2005.Handbook of Optical Systems vol. 2Wiley-VCH, Weinheim.
Schneider, C.A., W.S. Rasband, and K.W. Eliceiri. 2012. "NIH Image to ImageJ: 25 years of image analysis", Nat. Methods,9, 671-675)or Igor Pro 6.03 (Wavemetrics, Lake Oswego, OR).
Sibarita. J.-B. 2005. "Deconvolution microscopy", Adv. Biochem. Engin./Biotechnol.95, 201-243.
Gibson, S.F., and F.Lanni. 1991. "Experimental test of an analytical model of aberration in an oil-immersion objective lens used in three-dimensional light microscopy", J. Opt. Soc. Am. A8, 1601-1613.

* cited by examiner

AUTOMATED QUANTITATIVE RESTORATION OF BRIGHT FIELD MICROSCOPY IMAGES

FIELD OF THE INVENTION

The herein invention is related to restoration of bright field images generated with optical microscopes.

BACKGROUND OF THE INVENTION

The development of novel tools and methods has recently shaped remarkable advances in the field of optical microscopy of biological samples, with particular emphasis in fluorescence imaging (M. Oberholzer, M. Ostreicher, H. Christen&M. Brühlmann, 1996 "Methods in quantitative image analysis", *Histochem. Cell Biol.*, 105, 333-55). Although fluorescence enables the localization of specific targets with exquisite sensitivity, it presents limitations (M. Tscherepanow, F. Zöliner, M. Hillebrand, &F. Kummert, 2008 "Automatic Segmentation of Unstained Living Cells in Bright-Field Microscope Images" in *Advances in Mass Data Analysis of Images and Signals in Medicine, Biotechnology, Chemistry and Food Industry*, Springer Berlin Heidelberg, 158-172), such as photobleaching, phototoxicity, and spectral bleed-through due to an increased number of wavelength channels observed. To help minimize these potential constraints, non-fluorescence microscopy modalities are used whenever appropriate, e.g. during evaluation of cellular morphology. Phase contrast and differential interference contrast (DIC) are two widely employed microscopy procedures that effectively render visible unlabeled cells, albeit with associated optical artifacts (the presence of bright and dark halos surrounding cells) that difficult quantitative measurements of cellular shape and size. To overcome fluorescence microscopy limitations, the visualization of unstained samples through bright field microscopy (BFM) has been proposed as an alternative or complementary method to detect, count and/or quantify cell morphology. The use of BFM to test the effects of diverse treatments within cell populations using high-throughput methods is an alternative to the standard cell cytometry approach based on fluorescence microscopy. However, for optically thin and transparent samples such as, but not limited to, unstained cells BFM images lack necessary contrast. This characteristic precludes the use of conventional BFM for cell morphology studies and for high-throughput approaches, as automated segmentation usually requires high-contrast images. To overcome this limitation two approaches have been proposed: the development of segmentation algorithms that work with low-contrast BFM images (M. Tscherepanow, et al., 2008 supra; R. Ali, et al., 2012, "Automatic segmentation of adherent biological cell boundaries and nuclei from brightfield microscopy images", *Mach. Vis. Appl.* 23, 607-621; S. Tse, L. Bradbury, J. W. L. Wan, H. Djambazian, R. Sladek, T. Hudson, 2009, "A combined watershed and level set method for segmentation of brightfield cell images", *Proc. SPIE*, 7259, Medical Imaging 2009: Image Processing, 72593G) and the development of methods that increase the image contrast so standard segmentation algorithms become feasible. In the present disclosure we focus on strategies that increase image contrast for further processing, through standard segmentation for cell morphology studies and automated high-throughput approaches.

The BFM images carry amplitude and phase information and for optically thin and transparent objects (phase objects) the amplitude component is negligible; this is why BFM images of unstained cells present poor contrast. Furthermore, for phase objects observed under BFM, image contrast is minimal at the focal plane and it increases as the amount of defocus below and above the focal plane increases. The observation of a sample in an out of the focus plane in BFM is known as defocusing microscopy (DM). Agero et al. have shown that a DM image is related to the surface curvature of the object and have used this method to measure the curvature fluctuations at the surface of unstained macrophage cells (U. Agero, L. G. Mesquita, B. R. A. Neves, R. T. Gazzinelli, O. N. Mesquita, 2004, "Defocusing microscopy", *Microsc. Res. Tech.*, 65, 159-165; J. C. Neto, U. Agero, R. T. Gazzinelli, O. N. Mesquita, 2006, "Measuring Optical and Mechanical Properties of a Living Cell with Defocusing Microscopy", *Biophys. J.*, 91, 1108-1115). Even when DM increases the contrast of an image allowing a better visualization of the phase object, it also introduces a significant blurring on the image of the object, impeding the use of DM for a quantitative analysis of shape. However, the DM approach has proved effective for automatic cell counting. Drey et al. (L. L. Drey, M. C. Graber, J. Bieschke, 2013, "Counting unstained, confluent cells by modified bright-field microscopy", *Biotechniques*, 55, 28-33) have developed a High Contrast (HC) bright field method for cell counting, using DM in conjunction with two optical accessories that increase contrast: a monochromatic filter and a pinhole aperture placed between the condenser and the sample. This methodology is currently used by BioTek Instruments, Inc. to perform microplate-based automated label-free cell counting (Paul Held, Joe Clayton, and Peter Banks, 2016 "High Contrast Bright field Enabling Microplate-based Automated Label-free Cell Counting", BioTek:Tech Note).

For cell populations with an homogeneous ellipsoidal shape, such as hematopoietic stem cells, Buggenthin et al. (F. Buggenthin, et al., 2013 "An automatic method for robust and fast cell detection in bright field images from high-throughput microscopy", *BMC Bioinformatics*, 14, 297) adapted a defocusing microscopy approach with additional digital imaging processing to get a high-throughput, robust, and automated cell counting method from BFM images of unstained cells.

Another approach to address the low contrast of BF images of unstained biological samples is the phase imaging method based on solving the transport of intensity equation (TIE). Methods based on the TIE use a standard BFM and provide a quantitative phase image of the in-focus field of view, producing a high-contrast image suitable for standard segmentation, and have the potential to add 3D shape characterization to the bright field images. Gorthi et al. (S. S. Gorthi, E. Schonbrun, 2012 "Phase imaging flow cytometry using a focus-stack collecting microscope", *Opt. Lett.* 37, 707) have implemented this concept into a high-throughput method named Phase imaging flow cytometer (PIFC). PIFC uses a fluid flow to translate the object through different focal planes where a sequence of images are acquired to calculate the derivative of the intensity along the optical axis, and then relate this derivative with the phase image using a second-order partial differential equation deduced from the TIE. Gorthi et al. visualized red blood cells and leukemia cells and used the deduced phase images to know the 3D shape variations of both cell populations. Important drawbacks for this method are: the implementation of the TIE formalism in practice has been difficult and results in phase errors, the selected defocused planes must be optimized (P. K. Poola, V. P. Pandiyan, R. John, 2015 "Quantitative imaging of yeast cells using transport of intensity equation", *IEEE in* 2015 *Workshop on Recent Advances in Photonics*) and the resulting phase image is often affected by low-frequency noise which can obscure images of cells (D. Paganin, A. Barty, P. J. McMahon, K. A. Nugent, 2004 "Quantitative phase-amplitude microscopy. III. The effects of noise", *J. Microsc.*, 214, 51-61).

A different digital processing approach to improve image quality and to increase image contrast in bright field is disclosed in U.S. Pat. No. 8,744,164 B2 and in J. Selinummi, et al. 2009, "Bright Field Microscopy as an Alternative to Whole Cell Fluorescence in Automated Analysis of Macrophage Images", *PLoS One*, 4, e7497, where a bright field image stack is first acquired by defocusing the sample through evenly-spaced increments and then the intensity variation between images (image stack variance) is computed. They proved that the resulting two-dimensional projection image has increased contrast and it can be segmented through standard algorithms developed for fluorescent microscopy (available in the freely-distributed software CellProfiler). Cell morphology obtained through the intensity projection method matches the morphology of the same cells found by fluorescent microscopy, validating the effectiveness of the intensity projection method. Some drawback of this method are: the need to rapidly acquire at least three images at different focal planes (before cells present any cell movement or morphological change), the simultaneous acquisition of bright field and fluorescence images for automated segmentation of bright field images (for cells with heterogeneous shapes such as macrophages), and finally for cells such as yeast U.S. Pat. No. 8,744,164 B2 mentions that important halo effects in bright field images are emphasized erroneously with this intensity projection method.

Adiga et al. (U. Adiga, et al., 2012 "Automated Analysis and Classification of Infected Macrophages Using Bright-Field Amplitude Contrast Data", *J. Biomol. Screen.*, 17, 401-408), US2017/052106A1 and WO2015/168026A2 have proposed high-throughput methods for classification of unstained cell populations using machine learning-based methods. Adiga et al. increased BFM images contrast by extending the camera exposure time, and using a digital contrast enhancement step followed by background subtraction. An improved segmentation algorithm is then performed and finally they implemented a machine learning algorithm for the automated classification of different cell populations, based on thousands of parameters obtained from the bright field image. The method of US2017/052106A1 does not have a contrast enhancement step; instead, they use BFM images and dark field microscopy images together with a standard segmentation step performed on the freely-distributed software CellProfiler to feed their machine learning algorithm to classify cells according to stage in the cell cycle or cell type.

The use of deconvolution as a method to increase image contrast has been proposed. Deconvolution is an image restoration method, well established for fluorescent microscopy, which reduces the effect of out-of-focus light to yield a sharper image. Deconvolution is performed through iterative algorithms, where the point spread function (PSF) is provided either as a measured PSF or as a theoretical PSF. Alternatively, in blind deconvolution the PSF does not need to be known and it is obtained as an output of the iterative algorithm, together with the final restored image.

For BFM the implementation of deconvolution algorithms has been scarce due to the experimental difficulties of measuring the PSF, limited by low signal and poor contrast produced by sub-diffraction sized beads used in these measurements. In addition, the PSF in BFM possesses an amplitude (aPSF) and a phase (pPSF) component, thus standard deconvolution algorithms (such as those used in fluorescence microscopy) cannot be applied unless one of the two BFM PSF components is neglected. Typically, thin samples are stained for observation in bright field, and therefore only the amplitude component of the PSF (aPSF) is considered.

P. J. Tadrous, 2010 ("A method of PSF generation for 3D brightfield deconvolution", *J. Microsc.*, 237, 192-199), pointed out the difficulties to propose a theoretical PSF for BFM, and he presents a method to estimate the bright field PSF based on deconvolution of a measured z-stack from a thin sample and starting with an idealized PSF. However, this methodology works only with high-contrast thin samples, which implies a staining step. Holmes et. al., point out the experimental difficulties of measuring the PSF in BFM, so they proposed a blind deconvolution method where the PSF does not need to be known to obtain a restored image (T. J. Holmes, N. J. O'Connor, 2000 "Blind deconvolution of 3D transmitted light brightfield micrographs", *J. Microsc.*, 200, 114-27). However, their blind deconvolution algorithm is also restricted to absorbing (stained) samples, where the phase component of the image and the phase component of the PSF are both ignored to simplify the deconvolution algorithm.

Image analysis software programs such as CellProfiler or Huygens Software by Scientific Volume Imaging allow to perform deconvolution on bright field images, as long as the images present high contrast, so the deconvolution process offered by these software programs are not suitable for phase objects such as unstained cells.

Recently, Hernandez-Candia and Gutiérrez-Medina (C. N. Hernandez Candia, B. Gutiérrez-Medina, 2014 "Direct Imaging of Phase Objects Enables Conventional Deconvolution in Bright Field Light Microscopy", *PLoS One*, 9, e89106) have used computer-enhanced bright field microscopy (CEBFM) (B. Gutiérrez-Medina, S. M. Block, 2010 "Visualizing individual microtubules by bright field microscopy", *Am. J. Phys.*, 78, 1152-1159) with and improved image background acquisition step to get, for the first time, the measured pPSF of a BFM with a high signal-to-noise ratio. They proposed a phenomenological model for the pPSF that was in excellent agreement with measurements, and as a proof of principle they applied standard deconvolution to CEBFM images of unstained cells. Restored images of bacteria cells showed an increased contrast with a well-defined cell boundary, fully removing the halo of bright-dark rings characteristic of bright field images. Unlike previous BFM deconvolution methods which are restricted to high contrast images, the work of Hernandez-Candia et al. is suitable for phase objects, such as unstained cells, which produced a low contrast image.

The disclosure presented herein also uses deconvolution as a means to restore images of unstained samples, increasing their contrast. However, unlike Hernandez-Candia et. al. in the herein invention deconvolution is performed from a theoretical pPSF, and the image restoration procedure is validated by showing that quantitative analysis of sample size and shape in the deconvolved bright field image and in a reference fluorescence image are in agreement. In addition, it is proved that quantitative analysis of sample morphology can be performed from two dimensional (2D) deconvolution of a single input frame, and that BF digital restoration of unstained samples can be used in high-throughput image cytometry approaches.

SUMMARY OF THE INVENTION

The herein invention is related to a quantitative image restoration in bright field optical microscopy (QRBF). In the first embodiment the 3D QRBF method comprises of: a) to acquire background-free bright field images of a phase object immobilized on a sample coverslip to produce a z-stack; b) to automatically calculate, the proper theoretical phase Point Spread Function (pPSF), considering the specific description of the bright field microscope and the optic sample characteristics; c) to apply a three-dimensional deconvolution routine using said pPSF and said image z-stack of a phase object. In a further embodiment of the invention, said specific description of the bright field microscope comprises: numerical aperture of the objective lens and the wavelength of illumination. Furthermore, said optic sample characteristic is the index of refraction of the medium between the objective and the coverslip. Is an embodiment that the deconvolution routine provides a well-defined boundary of phase objects that matches the boundary detected by standard methods that require staining. In said method the phase Point Spread Function is defined by:

$$pPSF(x,y,z) = \int_0^1 J_0[kNA\rho[x^2+y^2]^{1/2}]\sin[knz[[1-(NA\rho/n)^2]^{1/2}-1]]d\rho,$$

where $J_0$ is the zeroth-order Bessel function of the first kind, $k=2\pi/\lambda$, $\lambda$ is the wavelength of illumination, NA is the numerical aperture of the microscope objective, n is the index of refraction of the medium between the objective and the coverslip, (x,y) are transversal image coordinates and z is the amount of defocusing.

In a second embodiment, it is disclosed a 2D quantitative image restoration in bright field method (2D-QRBF). The 2D-QRBF method comprises of: a) To acquire a single background-free bright field image of the phase object in an out-of-focus plane; b) To automatically calculate, the proper theoretical pPSF image at the same amount of defocus that said background-free bright field image, considering the specific description of the bright field microscope and the optic sample characteristics; c) To apply a two-dimensional deconvolution routine using said pPSF and the defocused background-free bright field image of the phase object; d) To apply an intensity threshold to the restored bright field images generated in step (c); and e) To perform quantitative measurements of the phase object morphology (size and shape). It should be noted that said step (d) further comprises comparing other microscope generated images with deconvolved phase object images, as cells, in order to calculate said threshold, wherein said microscope generated images are fluorescence microscope generated images.

In said embodiment, said specific description of the bright field microscope comprises: numerical aperture of the objective lens and the wavelength of illumination. It should be considered within the method that said optic sample characteristic is the index of refraction of the medium between the objective and the coverslip, and the phase object comprises prokaryotic cells, eukaryotic cells, archaea cells, polymers, biological polymers, biofilms or transparent thin layer samples, wherein said phase object is unstained. Furthermore, the deconvolution routine provides a well-defined boundary of phase object that matches the boundary detected by other standard methods, wherein the deconvolution is carried out using the corresponding pPSF image at the same amount of defocus of said background-free bright field image. In this embodiment said pPSF is defined by:

$$pPSF(x,y,z) = \int_0^1 J_0[kNA\rho[x^2+y^2]^{1/2}]\sin[knz[[1-(NA\rho/n)^2]^{1/2}-1]]d\rho,$$

where $J_0$ is the zeroth-order Bessel function of the first kind, $k=2\pi/\lambda$, $\lambda$ is the wavelength of illumination, NA is the numerical aperture of the microscope objective, n is the index of refraction of the medium between the objective and the coverslip, (x,y) are transversal image coordinates and z is the amount of defocusing.

BRIEF DESCRIPTION OF THE FIGURES

FIG. 1—QRBF effectively restores cellular morphology in BF images of single *E. coli*. (A) The x-z intensity distribution of the theoretical pPSF used for deconvolution. z=0 corresponds to in-focus, where image contrast is least. (B)-(M) A cell undergoing division imaged using BF (8-D), QRBF (E-G), DIC (H-J) and fluorescence (F) (K-M) microscopy. x-z and z-y intensity profiles correspond to the dashed cyan lines of their respective x-y image. QRBF and F images are displayed in false color. z=0.3 μm in (B). (N-Q) Validation of QRBF. A cell is observed before (N) and after deconvolution (0). In (0) the cellular contour (black line) and width (red line) were automatically determined from the QRBF image. (P) The cellular contour identified in (0) superimposed to the corresponding fluorescence image of the same cell. (Q) Distribution of cellular widths (W) for a bacterial population (n=108), measured from BF images deconvolved using a theoretical (black bars) or experimental (red bars) pPSF. The blue line is a Gaussian fit to the theoretical-pPSF width distribution (653 nm±73 nm, mean±s.d.). The inset displays the width values, showing coincidence between the two types of data. Scale bars, 2 μm;

FIG. 5—2D-QRBF is optimum when both cell and pPSF images are defocused by the same amount. (A) Same as FIG. 3A. (B) The result of 2D-QRBF, where only one pPSF (indicated by a white square in FIG. 3B) was used to perform deconvolution for all bacterium images shown in (A). The 2D-QRBF image with the optimum contrast (indicated by a white square) results when both cell and pPSF images have the same amount of defocusing (in this case z=−2 μm). Image restoration is effective only for a maximum of ≅0.5 μm mismatch in defocus. Entire field of view, 33.5 μm×33.5 μm;

FIG. 7—High-throughput, automated quantification of bacterial width and length during hyperosmotic shock. (A) 2D-QRBF image of unstained *E. coli* cells immobilized on a coverslip at [NaCl]=0.5 M. Insets show enlarged views of cells, evidencing plasmolysis (white arrows). The contours of cells (black lines) were determined automatically. Scale bar, 5 µm (1 µm, insets). (B) Cell samples exposed to increasing concentrations of NaCl were imaged and processed using 2D-QRBF. The cellular width (W) was plotted against length (L) and two-dimensional histograms were created for four different [NaCl] datasets (0, 0.25, 0.5, and 1.0 M). Histograms were normalized with respect to the maximum bin count. (C) Histograms (P) of width (W) and length (L) for increasing [NaCl], normalized by the number of cells measured in each case. Insets, width ($W_n$) and length ($L_n$) values normalized with respect to W and L values at [NaCl]=0 M, (mean±s.d.). For B-C: n=2,283 (0 M); 4,596 (0.25 M); 6,657 (0.5 M); 6,079 (1 M);

FIG. 9—Application of QRBF to *S. cerevisiae* cells. (A-C) Images show the same cell imaged under bright field (A), QRBF (B), and fluorescence (C) microscopy. Projection planes correspond to the dashed cyan lines. Cellular shape in the bright field image (A) is not defined. In QRBF (B) image restoration is effective near the middle z-plane of the cell (white bracket in the zy image of 8), enabling automated assessment of cell contour (white line in the xy projection). In the reference image (C), a GFP-tagged diffusible protein imaged under fluorescence shows the cellular cytoplasm. The white line in (C) corresponds to the cellular contour determined in (B) and matches fluorescence, evidencing accuracy in QRBF. Notably, the vacuole shown in fluorescence (green arrow) is also recovered in QRBF. (D) Budding yeast imaged under bright field (BF), QRBF and fluorescence (F). A comparison between QRBF and F indicates that cellular shape is recovered in QRBF, including the vacuole shown in F (green arrow). However, in QRBF the region around the yeast budding neck (white arrow) does not show. Scale bars: 3 µm.

DETAILED DESCRIPTION OF THE INVENTION

The invention presented herein is related to light bright field (BF) microscopy as an alternative to image unstained samples. Our aim is to improve the quality of BF images of unstained samples using a digital imaging processing method that restores the image of phase objects, allowing a quantitative characterization of the sample morphology compatible with high-throughput and automated methods.

Our quantitative image restoration in bright field method (henceforth referred to as QRBF) is based on standard deconvolution as a way to improve the image quality of unstained phase objects, using for the deconvolution process a theoretical pPSF and one or more background-free images acquired with the BFM.

The QRBF method is suited for phase objects where the amplitude contributions to the image formation and the aPSF term are negligible, allowing to perform standard linear deconvolution to restore the image of phase objects. However, instead of using a measured pPSF for deconvolution as Hernandez-Candia and Gutierrez-Medina (C. N. Hernández Candia, B. Gutiérrez-Medina, 2014 "Direct Imaging of Phase Objects Enables Conventional Deconvolution in Bright Field Light Microscopy", *PLoS One,* 9, e89106), our QRBF method uses a theoretical pPSF based on elemental considerations of image formation theory.

To validate our QRBF method, standard three-dimensional (3D) deconvolution was performed using a collected z-stack of background-free images of a phase object and our proposed theoretical 3D pPSF. The resulting QRBF images compare favorably with alternative image approaches, and present an excellent definition of sample boundaries in 2D. Setting a proper intensity threshold the boundaries of the sample at the central xy-plane of the deconvolved z-stack reported by our QRBF method matches the boundary of the sample reported by fluorescent microscopy; therefore our QRBF method can be used to perform quantitative measurements on unstained objects from 2D images, as it is currently performed with standard methods that do require staining (such as fluorescent microscopy).

The acquisition of a background-free image z-stack to perform deconvolution is a time consuming process and requires that the sample remains static during stack acquisition. We propose a two-dimensional QRBF (2D-QRBF) method where a single defocused BF image of the phase object is deconvolved with the corresponding pPSF image at the same amount of defocus. The resulting 2D-QRBF image effectively restores the boundary shape of the phase object with a high contrast, allowing the implementation of standard segmentation in an automated fashion for high-throughput applications. The presented 2D-QRBF method is a different approach to solve the problem of how to deal with low contrast bright field images for high-throughput applications. The advantages of our 2D-QRBF method are:

The method is suitable for phase objects, so thin and transparent unstained samples of organic or inorganic materials can be observed.

Only one 2D image needs to be acquired, making the acquisition step faster and avoiding deleterious effects due to cell movements.

The deleterious effects of halos present in bright field images are removed by 2D deconvolution, yielding well-defined boundaries of objects that matches the boundaries detected by standard methods that require sample staining such as fluorescence microscopy.

An appropriate theoretical pPSF is used, eliminating the need to measure the pPSF.

It can be performed in any BFM, without needing the introduction of additional optical elements.

Image contrast is significantly enhanced after deconvolution, making it possible to use standard segmentation algorithms in an automated fashion.

The method of the present invention can be disclosed as follows:

1. Acquire at least one background-free bright field image.
   a. To perform 3D-QRBF a z-stack of background-free images of the phase object immobilized on the sample coverslip is acquired by displacing the stage along the z axis in equal increments and acquiring images at each plane.

b. To perform 2D-QRBF a single background-free image of the phase object in an out of focus plane is acquired.

3. Compute the proper theoretical pPSF.

a. To perform 3D-QRBF the theoretical 3D pPSF has to be computed considering the specific description of the BFM such as: numerical aperture of the objective lens, the wavelength of illumination, the index of refraction of the medium between the objective and the coverslip.

b. To perform 2D-QRBF the theoretical 2D pPSF is computed at the same amount of defocusing where the background-free image of the phase object was acquired, considering the specific description of the BFM such as: numerical aperture of the objective lens, the wavelength of illumination, the index of refraction of the medium between the objective and the coverslip.

4. Apply the corresponding standard deconvolution routine (3D deconvolution or 2D deconvolution).

5. Apply an intensity threshold to the resulting QRBF images. The intensity threshold is previously defined from a comparison of QRBF images and reference fluorescence microscopy images.

a. Perform quantitative measurements.

b. For 2D-QRBF images standard segmentation algorithms can be applied to perform quantitative automated high-throughput measurements of sample morphology.

This method can be applied to a wide variety of samples, such as prokaryotic cells, eukaryotic cells, archaea cells, polymers, biological polymers, biofilms or transparent thin layer samples. These kind of samples are named herein as the phase objects and are unstained.

Accordingly, the following examples disclose the best way to practice the invention, without limiting the scope of the same.

Example 1

Figure 1:
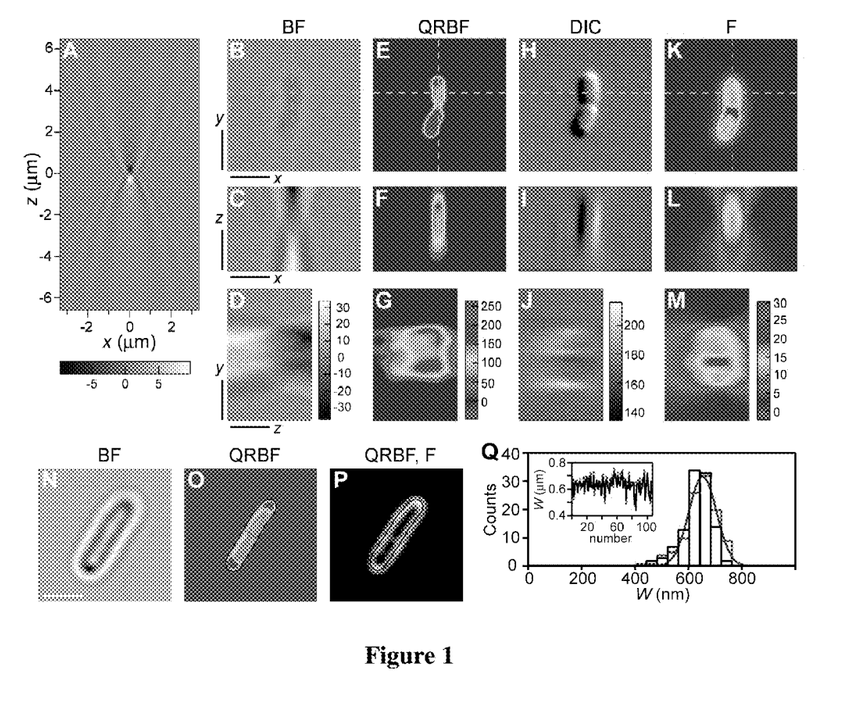

Using a conventional BF microscope operating under Koehler illumination, we collected z-stacks of background-free images of *E. coli* cells immobilized on a coverslip. An operational pPSF was generated based on Eq. (1) and three-dimensional (3D) deconvolution was performed on stacks of cell images using an available deconvolution routine.

$$pPSF(x,y,z) = \int_0^1 J_0[kNA\rho[x^2+y^2]^{1/2}]\sin[knz[[1-(NA\rho/n)^2]^{1/2}-1]]d\rho, \quad (1)$$

where $J_0$ is the zeroth-order Bessel function of the first kind, $k=2\pi/\lambda$, $\lambda$ is the wavelength of illumination, NA is the numerical aperture of the microscope objective, n is the index of refraction of the medium between the objective and the coverslip, (x,y) are transversal image coordinates and z is the amount of defocusing. FIG. 1A shows the resulting intensity distribution of the BF pPSF.

FIG. 1 shows how QRBF effectively restores images in 3D, turning an original BF image that features an ill-defined object (FIG. 1B,C,D) into the image of a cell undergoing division with excellent definition of boundaries in 2D (FIG. 1E). Deconvolution also improves images in 3D, although boundaries spread over an extended region (FIG. 1F,G). The resulting QRBF images compare favorably with alternative imaging approaches. In DIC cells are clearly visible but the image is dominated by asymmetric shadows that impede proper recognition of boundaries (FIG. 1H,I,J). In fluorescence, the standard method to evaluate cellular morphology, shape is well defined (FIG. 1K,L,M) and in correspondence with cellular boundaries observed in QRBF images.

Figure 2:
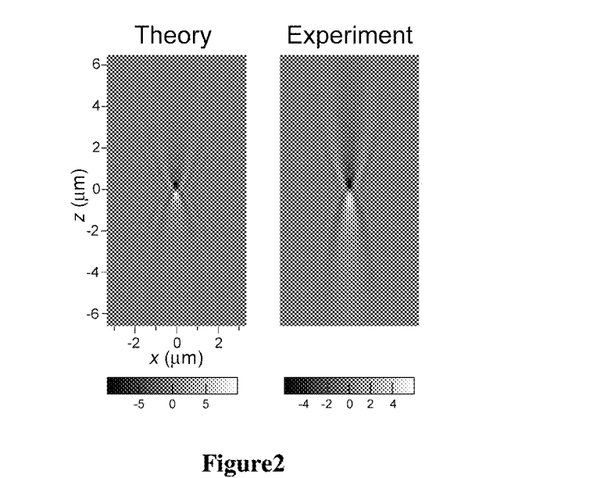
FIG. 2—Theory and experiment pPSF. A comparison of the operational pPSF produced from Eq. (1) in the main text and the experimental pPSF.

To validate our method, we compared 2D reference fluorescence images with characteristic QRBF images corresponding to a central xy-plane of the deconvolved BF image stack (FIG. 1N,O,P). Cell boundaries found in QRBF images (FIG. 1O) (obtained by specifying an intensity threshold) showed excellent overlap with the stained bacterial membrane of the same cells under fluorescence (FIG. 1P). This agreement enabled us to quantify size. We determined cellular width (W) from QRBF cell contours for a population of cells, and found an approximately Gaussian distribution (FIG. 1Q). To further confirm the validity of our choice of pPSF, we repeated our deconvolution procedure for the same set of cells using an experimentally measured pPSF (FIG. 2), finding similar results of width as with the theoretical pPSF (FIG. 1Q).

Example 2

Figure 3:
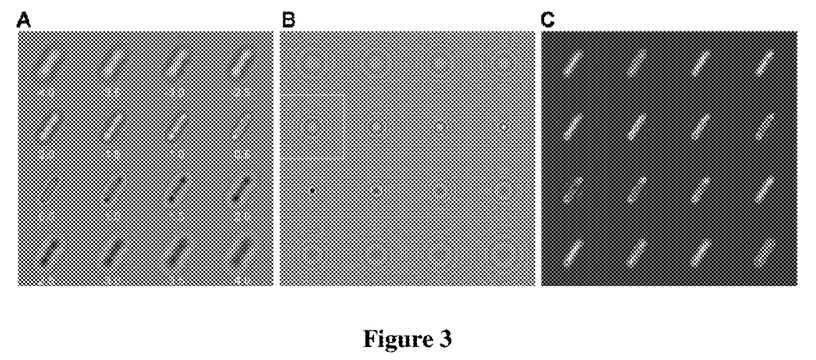
FIG. 3—Demonstration of 2D-QRBF. (A) BF images of a single bacterium, imaged at different amounts of defocus (z, indicated in μm). (B) x-y intensity profiles of the pPSF (shown in FIG. 1A) corresponding to the amount of defocus specified in (A). (C) Two-dimensional QRBF images resulting from the deconvolution of a defocused bacterium image in (A) with the corresponding 2D pPSF image in (B). The white square (6.7 μm×6.7 μm) shown in (B) corresponds to z=−2.0 μm, and is our 2D pPSF of choice used for deconvolution in 2D-QRBF.
Figure 4:
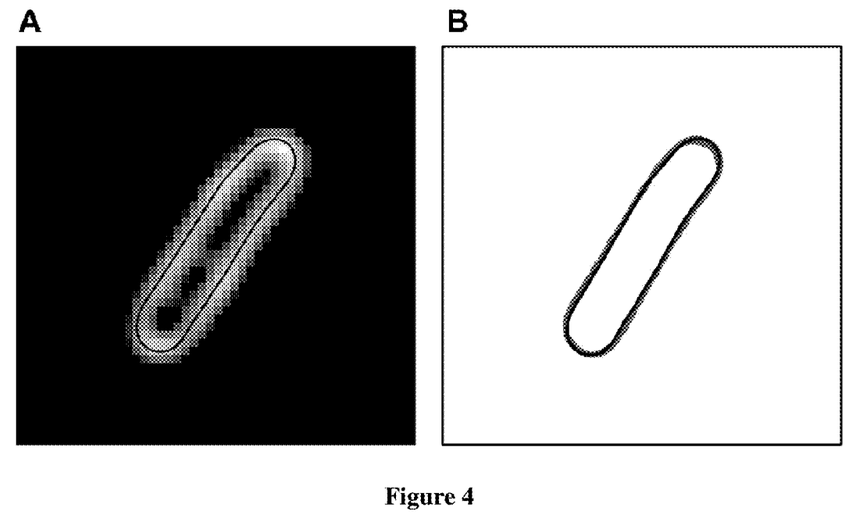
FIG. 4—Robustness of 2D-QRBF. (A) Same as FIG. 1P. The contour obtained through QRBF (black line) matches fluorescence of stained cellular membrane, thus becoming a reference contour for the bacterium. (B) The reference contour shown in (A) (black line) together with 9 additional contours (red) obtained for the 2D-QRBF images shown in FIG. 3 corresponding to the same bacterium. The contours correspond to the following amounts of defocusing (z): −2.5, −2.0, −1.5, −1.0, −0.5, +2.5, +3.0, +3.5, +4.0 μm. This result indicates that there is a significant range of defocusing distances over which 2D-QRBF successfully restores cellular morphology. Field of view, 5 μm×5 μm.
Figure 5:
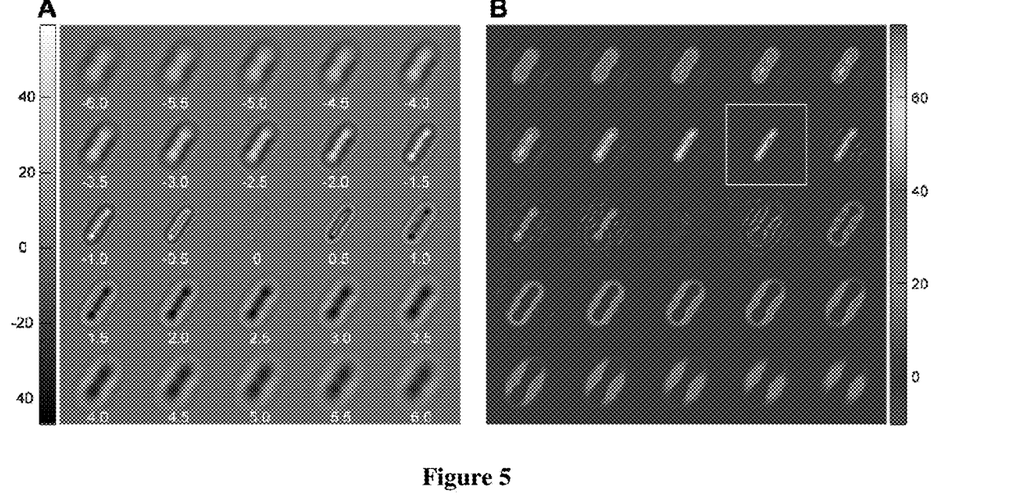
Figure 6:
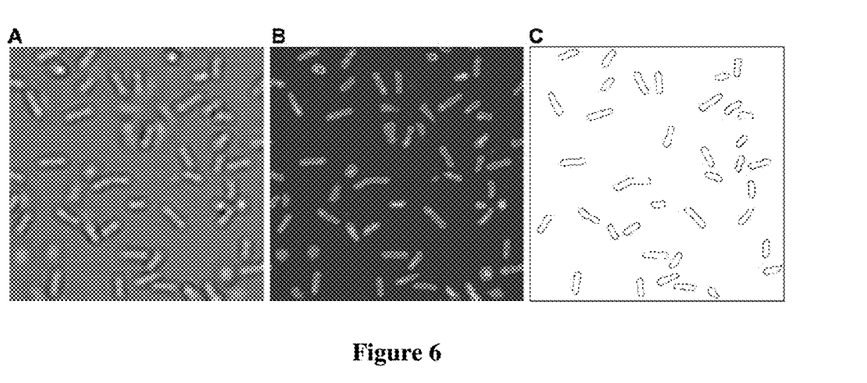
FIG. 6—Effective image segmentation in 2D-QRBF. (A) BF image of multiple unstained bacteria both attached to a coverglass and free in solution. (B) The corresponding 2D-QRBF image of (A) using the pPSF highlighted in FIG. 3B for deconvolution. (C) Straightforward segmentation of (B) retains the contours of surface-attached cells. Field of view, 26.8 µm×26.8 µm.

A large number of applications involving the study of cellular morphology would benefit from reliable, fast 2D-imaging of cells. To address this point, we implemented two-dimensional QRBF (2D-QRBF), where a single BF image of a defocused cell (FIG. 3A) is acquired and then deconvolved using the corresponding pPSF image at the same amount of defocus (FIG. 3B). The resulting 2D-QRBF image effectively restores cellular shape (FIG. 3C). Close inspection of cellular contour in 2D-QRBF images at various z-values above and below focus revealed that excellent agreement of cellular morphology is still maintained with respect to fluorescence microscopy (FIG. 4). Furthermore, we found that 2D-QRBF performs best when the amount of defocus is the same for both BF and pPSF images (FIG. 5), indicating that restoration is optimum at a given plane. We took advantage of this feature by applying 2D-QRBF on BF images of cells found both attached to a coverslip and free in solution (FIG. 6A). The resulting image showed that coverslip-bound cells present the highest contrast and definition of boundaries (FIG. 6B), greatly facilitating their segmentation (FIG. 6C).

Altogether, these results demonstrate that 2D-QRBF restores cellular shape accurately, provides robust conditions for segmentation, and enables expedite processing, thus fulfilling essential requirements to perform high-throughput, quantitative analysis of cellular morphology.

Example 3

Figure 7:
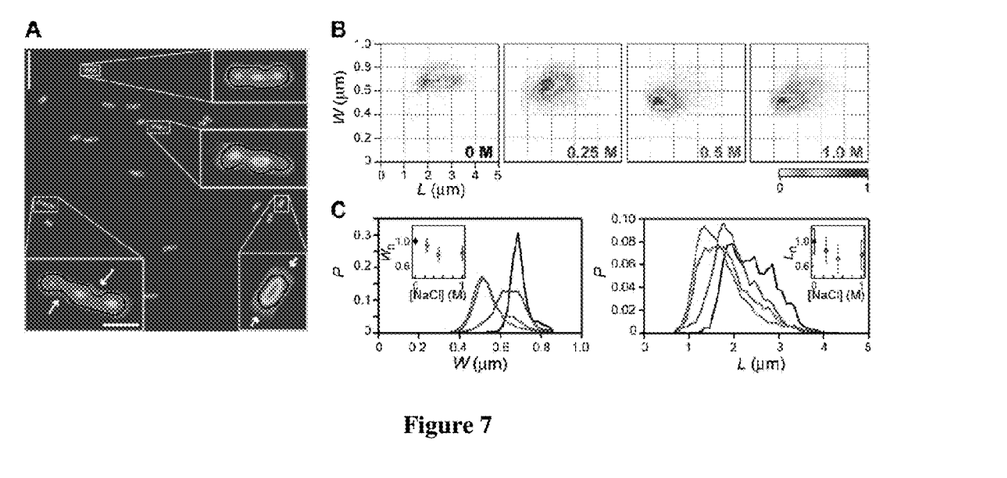
Figure 8:
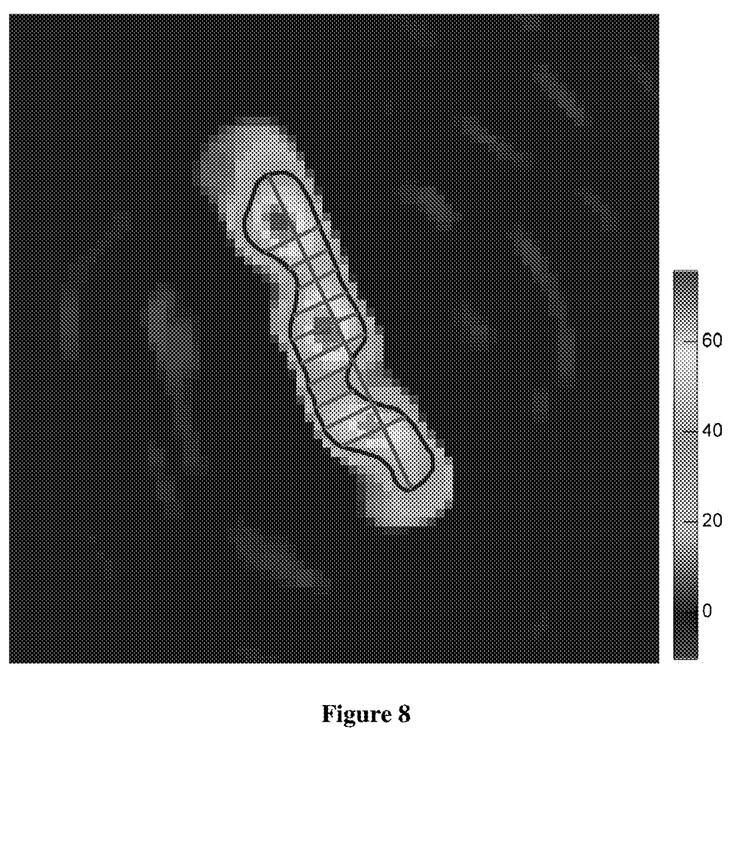
FIG. 8—Measurement of width and length in 2D-QRBF cell images during osmotic challenge. In the presence of plasmolysis the cell main axis (fuchsia line) was divided in 8 equally-spaced intervals, and the width at each interval was determined (gray lines). The characteristic bacterium width is the average of the individual widths. In this case, L=2.66 µm, W=437 nm. [NaCl]=0.5 M. Field of view, 5 µm×5 µm.

We applied 2D-QRBF in a new type of image cytometer to evaluate bacteria size changes in response to hyperosmotic shock. In the presence of hypertonic media bacteria modify their size and shape, developing plasmolysis—a process where water lost form the cytoplasm causes the inner plasma membrane to shrink away from the cell wall (P. Scheie, 1969. "Plasmolysis of *Escherichia coli* B/r with Sucrose", *J. Bacteriol.* 98, 335-340). Here, non-growing *E. coli* cells were deposited on coverslips, subjected to increasing external concentrations of the solute NaCl, and imaged using 2D-QRBF. The deconvolved images of osmotically challenged bacteria show cells with deformations and voids in the cell body (FIG. 7A) that are in remarkable similarity with fluorescence (M. C. Konopka, I. A. Shkel, S. Cayley, M. T. Record, J. C. Weisshaar. 2006. "Crowding and confinement effects on protein diffusion in vivo", *J. Bacteriol.* 188, 6115-6123) and electron microscopy (H. Schwarz, A. L. Kocht, 1995, "Phase and electron microscopic observations of osmotically induced wrinkling and the role of endocytotic vesicles in the plasmolysis of the Gram-negative cell wall", *Microbiology* 141, 3161-3170.) images of cellular cytoplasm during plasmolysis. We quantified cellular length (L) and average width (FIG. 8) for thousands of bacteria one cell at a time, using an automated computer routine. We found that for [NaCl]≤0.5 M both mean width and mean length of cellular populations systematically decreased as the solute concentration was increased (FIG. 7B,C), in accordance to previous reports (T. Pilizota, J. W. Shaevitz, 2013, "Plasmolysis and Cell Shape Depend on Solute Outer-Membrane Permeability during Hyperosmotic Shock in *E. coli*", *Biophys. J.* 104, 2733-2742).

Example 4

Figure 9:
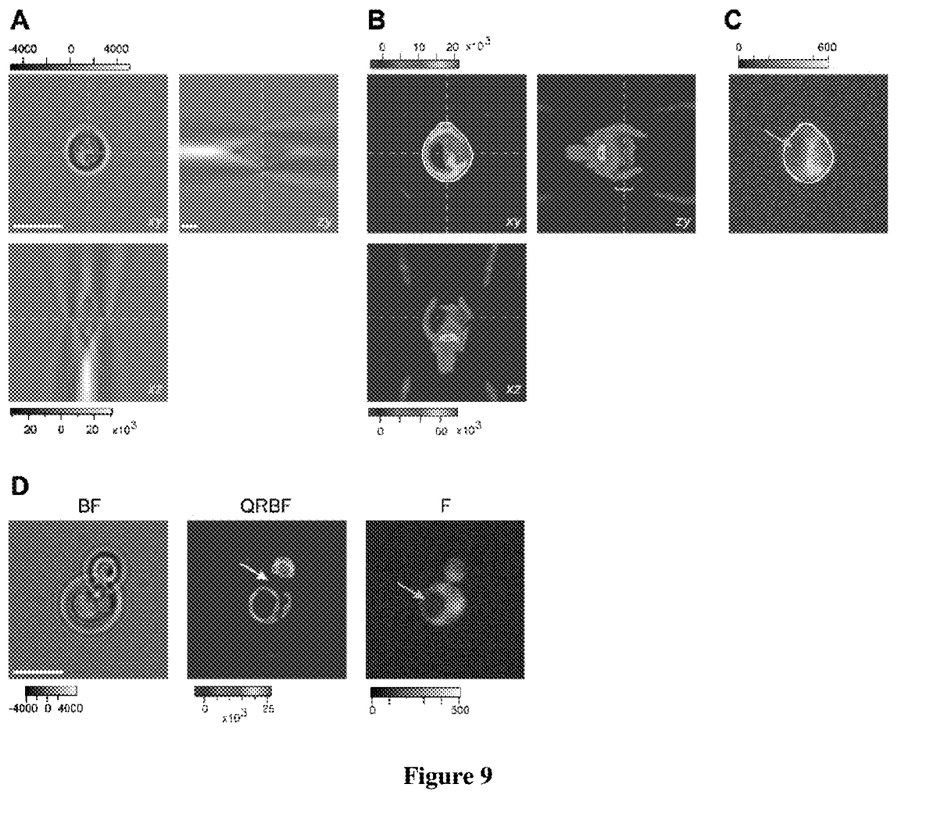

Wetested the performance of QRBF on cells with size significantly greater than the diffraction limit. Individual *Saccharomyces cerevisiae* cells were imaged under bright field, QRBF and fluorescence (FIG. 9A,B,C) and comparison showed that QRBF achieves partial restoration in 3D and accurate recovery of cell shape in 2D, where now even subcellular features such as vacuoles can be clearly visualized (FIG. 9C,D).

Example 5. Experimental Conditions

Examples 1 to 4 above disclosed were carried out by implementing the following experimental conditions:

Sample Preparations.

*E. coli* BL21 DE3 cells were cultured overnight in Luria Broth (LB) at 37° C. under constant shaking until they reached an optical density of ~0.4-0.6. A sample of cells was then used for experiments.

Fluorescence Staining.

A sample of cells was centrifuged, the supernatant discarded, and the pellet resuspended in phosphate buffer saline (PBS). This washing procedure was repeated two times. Cells were fixed using 0.2% (v/v) formaldehyde, and washed again using PBS. Next, cells were stained at the plasma membrane by incubating with the dye FM4-64 (Molecular Probes) at a final concentration 4 µg/mL during 1.5 h. Finally, diluted samples of bacteria were introduced in microscopy flow channels made with coverslips coated with poly-L-lysine. The flow cell was sealed using valap and samples were taken to the microscope for observation.

Hyperosmotic Shock.

A sample of cells was introduced in microscopy flow channels and bacteria were left to bind to poly-L-lysine-coated coverslips during 15 min. Next, LB was exchanged with 10 mM Tris-HCl (pH 7.5), and a final exchange was performed with the Tris-HCl buffer supplemented with sodium chloride at one of the following concentrations: 0 M, 0.25 M, 0.5 M, and 1.0 M. The flow cell was then sealed using valap, and samples were taken to the microscope for observation. Measurement times were limited to 1.5 h.

Yeast Cells.

*Saccharomyces cerevisiae* strain BY4741/RTR1-GFP, which expresses protein Rtr1 tagged with GFP, was used. Rtr1 is a phosphatase with nuclear and cytoplasmic localization. Yeasts were grown in synthetic complete medium (SC) to an optical density of ~1.0. A sample of cells was washed in SC and introduced in microscopy flow channels for observation.

Microscopy Imaging.

One commercial (Axio Imager M2, Zeiss, Oberkochen, Germany) and one home-made microscopes were used for imaging. To increase contrast in bright field, alignment was set to Kohler illumination and the numerical aperture of the condenser was adjusted to 0.1. The commercial microscope was used to obtain data presented in FIG. 1B, whereas all other data was obtained with the home-made apparatus. Main parameters of the commercial microscope were: immersion-oil objective lens (NA=1.3); white light illumination for BF and DIC; filter sets #43 and #38 (Zeiss) for fluorescence experiments with bacteria and yeast, respectively. The inverted, home-made microscope was composed of a light emitting diode (LED) illumination source (peak wavelength $\lambda$~450 nm), collector, condenser, objective (oil immersion, 100×, NA=1.3, Olympus) and camera lenses, and field and condenser diaphragms. The microscope was fitted with a z-axis piezoelectric stage (Nano-Z200, Mad City Labs, Madison, Wis.) that controls defocusing of the sample with 1-nm accuracy. BF images were acquired with an 8-bit charge-coupled device (CCD) camera (MV-D1024E-160-CL, Photonfocus, Lachen, Switzerland) and transferred to a computer for digital processing. For fluorescence imaging, a diode laser ($\lambda$=450 nm, Z-laser, Freiburg, Germany) was used for excitation and long-pass emission filters discriminated fluorescence light that was focused onto a low-noise CCD camera (iXon, Andor, Belfast, Northern Ireland).

For QRBF imaging, bacteria were first set in focus (by changing z and finding the point where cells were the least visible, z=0), and then imaged at various amounts of defocus above and below z=0. To reduce camera dark noise, 30 frames were acquired and averaged for every single field of view. A background frame previously acquired was subtracted from all digital BF images. The resulting background-free image z-stacks were stored for post-processing and deconvolution. For 2D-QRBF, the microscope was first set in focus and then defocused using the automated z-stage to a pre-established value (z=−2 µm). In the present description, z<0 values correspond to the objective lens moving away from the specimen. Once the microscope had the specified amount of defocus, 30 frames were acquired and averaged, providing a single image that was stored for post-processing. For the high-throughput, hyperosmotic shock experiments this imaging procedure was repeated every time the microscope stage was moved to sample different fields of view within a given flow cell. For imaging of yeast cells under BF each image of the z-stack consisted of a single frame.

Fluorescence images of bacteria were acquired in epifluorescence mode. To improve contrast, images were deconvolved following standard procedures. For yeast, we used optical sectioning (Apotome module, Zeiss).

Experimental Phase Point Spread Function (pPSF).

To measure the BF pPSF, we followed a standard procedure. Briefly, polystyrene beads of 100 nm in diameter were immobilized on a coverslip. An individual, isolated bead was imaged in BF, and to increase the signal-to-noise ratio:1) 30-frame averaging was performed, and 2) a given bead image was four-fold, rotationally-averaged by taking copies rotated by 0, 90, 180, and 270 degrees, respectively, and averaging them together. Next, the bead was imaged at 131 different axial positions by moving the piezoelectric stage along the (optical) z-axis in $\Delta z$=100 nm increments.

Theoretical pPSF.

Our theoretical BF pPSF follows from a phenomenological model that makes use of the three-dimensional imaging properties of a fluorescence light microscope with aberrations. In Abbe's theory of the transmitted-light BF microscope the illumination light interacts with a phase object, producing diffracted ($E_D$) and non-diffracted ($E_U$) field components that interfere at the image plane. This field interference gives rise to the image intensity distribution (I) (Singer, W., M. Totzeck, and H. Gross. 2005. *Handbook of Optical Systems vol.* 2 Wiley-VCH, Weinheim): $I \propto |E_D + E_U|^2 = |E_D|^2 + |E_U|^2 + 2\text{Re}(E_D E_U)$. As background-free images are considered throughout, the term $|E_U|^2$ is absent. Additionally, the term $|E_D|^2$ can be neglected as the scattered amplitude due to a phase object is small compared to the reference (illumination) wave. Therefore, we detect the interference term:

$$pPSF(x,y,z) \propto 2\text{Re}(E_D E_U). \quad (2)$$

For a BF microscope under Kohler illumination, the undiffracted amplitude at the image plane ($E_U$) is constant. For small numerical aperture values of the condenser (the condition used in the experiments described herein), the diffracted amplitude at the image plane ($E_D$) can be approximated as the field distribution of a point source produced by an ideal microscope with rotationally symmetric pupils, which is already known from fluorescence microscopy (Gibson, S. F., and F. Lanni. 1991. "Experimental test of an analytical model of aberration in an oil-immersion objective lens used in three-dimensional light microscopy", *J. Opt. Soc. Am. A*8, 1601-1613; Sibarita. J.-B. 2005. "Deconvolution microscopy", *Adv. Biochem. Engin./Biotechnol.* 95, 201-243.)

$$E_D(x,y,z) \propto \exp[j\pi/2] \int_0^1 J_0[kNA\rho[x^2+y^2]^{1/2}] \exp[jW(\rho)] d\rho, \quad (3)$$

where $J_0$ is the zeroth-order Bessel function of the first kind, $k=2\pi/\lambda$, $\lambda$ is the wavelength of illumination, NA is the numerical aperture of the microscope objective, $W(\rho)$ is a phase term introduced by optical aberrations (Gibson, S. F., and F. Lanni. 1991), $\rho$ is the normalized radius in the back focal plane of the objective lens, (x,y) are transversal image coordinates and z is the amount of defocusing. The term exp $[j\pi/2]$ is introduced as the diffracted component is retarded in phase by $\pi/2$ with respect to the undiffracted component. The phase aberration in fluorescence microscopy is (Gibson, S. F., and F. Lanni. 1991): $W_{fluo}(\rho)=knz[1-(NA\rho/n)^2]^{1/2}$, where n is the index of refraction of the medium between the objective and the coverslip, and we have neglected various terms that take into account mismatches between design and non-design parameters of the microscope. For the BF microscope, we use $W_{fluo}(\rho)$ and add an additional phase term between the $E_D$ and $E_U$ components, introduced by the defocusing of the microscope: $-knz$. Therefore, for BF: $W(\rho)=knz[[1-(NA\rho/n)^2]^{1/2}-1]$. Finally, substituting $W(\rho)$ into Eq. 3 and the result into Eq. 2, we obtain:

$$pPSF(x,y,z)=\int_0^1 J_0[kNA\rho[x^2+y^2]^{1/2}]\sin[knz[[1-(NA\rho/n)^2]^{1/2}-1]]d\rho,$$

where a multiplicative constant has been omitted. This is Eq. (1).

To perform 3D deconvolution, an operational 3D pPSF was produced by the following procedure. (1) Equation 1 in the main text was numerically integrated using a trapezoidal integration routine with the parameters of our imaging system: NA=1.3, $\lambda$=450 nm, n=1.515, 100 points (pixels) in x and y, 131 points in z, $\Delta x,y$=67 nm, and $\Delta z$=100 nm. (2) The resulting pPSF was multiplied by 50 in order to have resemblance the experimentally-measured pPSF in maximum and minimum intensities. (3) As pPSF (x,y,z=0)=0, the value 0.01 was subtracted to the entire pPSF in order to avoid numerical instabilities during deconvolution. (4) To further resemble the experimentally-measured pPSF (whose diffraction rings become less pronounced away from z=0), the operational pPSF was smoothed according to $pPSF_S(x,y,z)=pPSF_{BS}(x,y,z)e^{-|z|/30\Delta z}$, where $pPSF_{BS}$ and $pPSF_S$ are the pPSF before and after smoothing, respectively. The function $pPSF_S$ was finally used in deconvolution.

Image Processing.

All digital image processing was carried out automatically by using routines developed in ImageJ (Schneider, C. A., W. S. Rasband, and K. W. Eliceiri. 2012. "NIH Image to ImageJ: 25 years of image analysis", *Nat. Methods*, 9, 671-675) or Igor Pro 6.03 (Wavemetrics, Lake Oswego, Oreg.), as specified.

Deconvolution.

To implement QRBF, 3D deconvolution was performed on BF image z-stacks of bacteria attached to coverslips, using an iterative deconvolution algorithm available in the ImageJ plugin *Deconvolution Lab* (Deconvolution Lab. 2017. accessed 14 Apr. 2017. http://bigwww.epfl.ch/deconvolution/deconvolutionlab1/). To perform deconvolution, the operational theory-pPSF described above was used everywhere, except for data presented in FIG. 1O, where the experimentally measured pPSF was used. The following parameters were used in Deconvolution Lab: algorithm: Tikhonov-Miller; regularization parameter (lambda): 0.005; number of iterations (k): 100; positivity constraint: true; normalize pPSF: true; recenter pPSF: true; initial estimation: a blank image was provided; use FFTW: false. Images were not further processed for appearance after deconvolution.

To implement 2D-QRBF, deconvolution was performed as before except that single BF and operational theory-pPSF 2D images were used. The BF image was acquired at z=-2 μm defocus, and the corresponding pPSF image was a selected x-y slice from the operational theory-pPSF with the same amount of defocus.

Bacterial Cell Contour.

To compare the result of QRBF with the corresponding reference in images in fluorescence, individual bacteria were considered (FIG. 1O,P). We first selected a representative xy-plane from a given QRBF z-stack, simply by choosing the central slice with the highest mean pixel count value. Next, the cellular contour was obtained as a list of (x,y) coordinates for the representative QRBF image (FIG. 1O, see below). Finally, the QRBF cellular contour line was superimposed to the fluorescence image (FIG. 1P) and aligned by making their respective center of mass coincide.

Cellular contours were determined from QRBF images by the following procedure. 1) The center of mass (CM) coordinates ($x_{CM}$, $y_{CM}$) of the image were determined, and the average intensity value ($I_{avg}$) of a 3×3 pixel$^2$ region centered at ($x_{CM}$, $y_{CM}$) was obtained. We found that QRBF images are essentially background-free; therefore, in the QRBF image of a single-bacterium the CM approximately coincides with the centroid of the bacterium, and thus the $I_{avg}$ value is representative of the bacterium body intensity. 2) A threshold value ($I_{th}$) was established as: $I_{th}=T \times I_{avg}$, where T is a value between 0 and 1 that is kept constant for all images belonging to a particular experimental condition. T-values used in our work: 0.7 (3D QRBF using the theoretical pPSF), 0.6 (3D QRBF using the experimentally measured pPSF), 0.5 (2D-QRBF), and 0.3 (yeast). 3) We defined the cellular contour as a collection of points with intensity values corresponding to $I_{th}$. To find these points, each pixel element of the bacterium image was interrogated. When a pixel with intensity value $I_{i,j}>I_{th}$ was identified, the eight neighbor pixels were further scrutinized. When a neighbor pixel with intensity $I_{k,l}<I_{th}$ was found, a n-th cell contour point with coordinates ($x_n,y_n$) was produced by linear interpolation between the (i,j) and (k,l) pixels: $x_n=f \times (I_{i,j}-I_{th})/(I_{i,j}-I_{k,l})+i$, where f can take the values (0, 1, $\sqrt{2}$) depending on the neighbor pixels situated (above or below, left or right, diagonal). A similar procedure is followed for $y_n$. Typically N~200 contour points were produced for each bacterium. Finally, points were sorted based on Euclidean distance and a 5-point binomial smoothing was applied.

Measurement of Bacterial Length and Width.

To quantify length (L) and width (W) of bacteria in QRBF images, the contour coordinates $\{(x_i,y_i): i=1 \ldots N\}$ were considered. To find L, the points $(x_{L1},y_{L1})$ and $(x_{L2},y_{L2})$ spanning the maximum Euclidean distance among all contour points are identified. The line passing through these two points defines the cell main axis, and $L=[(x_{L2}-x_{L1})^2+(y_{L2}-y_{L1})^2]^{1/2}$. For QRBF data presented in FIG. 1O,Q, we quantified a characteristic width located around the center of the bacterium length. First, the center of mass of the contour points was computed: $(x_0,y_0)$. Then, the contour point $(x_A, y_A)$ with the least Euclidean distance with respect $(x_0,y_0)$ was identified. Next, the contour point $(x_B,y_B)$ with the least Euclidean distance with respect to the line that is perpendicular to the cell main axis and that passes through $(x_A,y_A)$ was identified.

Finally, $W=[(x_B-x_A)^2+(y_B-y_A)^2]^{1/2}$. For the case of bacteria under hyperosmotic shock, plasmolysis turns cellular shape into irregular due to the appearance of cytoplasm voids within the bacterium body, making inappropriate to determine width at a single location. To address this point, an averaging procedure was followed. The cell main axis was divided into 10 equally-spaced segments, resulting in 11 points corresponding to $sL/10$ ($s=0 \ldots 10$). To compute average width the bacterium end cap regions were excluded; therefore, only the points $s=2 \ldots 8$ were considered (see FIG. 8). For a given anchor point, the line $\hat{}_s$ passing through the anchor point and perpendicular to the cell main axis was determined. Next, the two contour points $(x_{As},y_{As})$ and $(x_{Bs},y_{Bs})$ with the least Euclidean distance with respect to $\hat{}_s$ and located at opposite sides with respect to the cell main axis were identified, and $W_s=[(x_{Bs}-x_{As})^2+(y_{Bs}-y_{As})^2]^{1/2}$ was computed. Finally, the procedure is repeated for each one of the 8 anchor points, and the characteristic bacterium width is found: $W=(1/8)\Sigma_{s=2}^{8} W_s$. Cell contour analysis and quantification of width and length was performed using Igor Pro.

High-Throughput Analysis.

Bacteria were subjected to hyperosmotic shock and the length and the width of individual cells were measured, for thousands of cells. To begin, segmentation was performed on 2D-QRBF images of multiple cells attached to coverslips, identifying and isolating images of individual bacteria for subsequent quantification of morphology. The following pipeline was carried out for segmentation in Image J. (1) Open a given QRBF image; (2) Apply median smoothing (radius=1); (3) Apply thresholding to remove residual background noise, maintaining pixels with counts above the arbitrary value 13.0 unmodified and setting counts of all others to zero; (4) Binarize image; (5) Run the Analyze Particles macro with parameters (size=180-600 pixels$^2$, circularity=0.0-0.8, show=Masks); (6) Dilate identified particles; (7) Run the Analyze Particles macro with parameters (size=0-Infinity pixels$^2$, circularity=0.0-1.0), recording the bounding box coordinates of each particle found; and (8) Use bounding box coordinates to duplicate images of individual bacteria located in the original QRBF image, and store images for posterior analysis. Alternatively, using the option show=Outlines in step 5 produces the image shown in FIG. 6C.

Finally, each image corresponding to an individual bacterium was processed to determine L and W as described above, and data were pooled, analyzed and displayed. Occasional errors were produced by the automated segmentation and morphology quantification procedures, classifying into three types. First, cells joined or in close proximity resulted in incorrect assessment of the cell main axis (and consequently of cell width). Second, deconvolution presented boundary effects, introducing image imperfections on cells near the edges 50 pixels) of the field of view. These two types of errors were minimized by excluding these images from our analysis. Third, during hyperosmotic shock some cells displayed a severe plasmolysis that resulted in fragmentation of the cytoplasm, where a 2D-QRBF bacterium image showed regions of high intensity joined by a much less intense trail. For these cells automated segmentation correctly identified the whole cell, but the morphology quantification procedure (involving thresholding) recognized only a limited region of the cell, resulting in an underestimation of length. This error is present mainly at [NaCl]=0.25 M, and we estimate that it affects ~10% of cell images.

The invention claimed is:

1. A method for quantitative image restoration in bright field light microscopy, the method comprising the steps of:
    a) acquiring a z-stack of background-free bright field images of a sample phase object immobilized on a coverslip, wherein said sample phase object is unstained;
    b) calculating a bright field theoretical phase point spread function that considers a specific description of the bright field microscope and an optical sample characteristic;
    c) producing a set of quantitative restored bright field images by applying a three-dimensional deconvolution routine using said bright field theoretical phase point spread function and said z-stack images of a sample phase object;
    d) applying an intensity threshold to the set of quantitative restored bright field images generated in step (c); and
    e) performing quantitative measurements of a morphology of said sample phase object on a central xy image of the set of quantitative restored bright field images generated in (c).

2. The method according to claim 1, wherein said specific description of the bright field microscope comprises: numerical aperture of an objective lens of the microscope and the wavelength of illumination of the microscope.

3. The method according to claim 1, wherein said optical sample characteristic is the index of refraction of the medium between the objective lens of the microscope and the coverslip.

4. The method according to claim 1, wherein the three-dimensional deconvolution routine provides an image of said sample phase object with a well-defined boundary that matches a boundary detected by methods that require sample staining.

5. The method according to claim 1, wherein said bright field theoretical phase point spread function (pPSF(x,y,z)) is defined by:

$$pPSF(x,y,z)=\int_0^1 J_0[kNA\rho[x^2+y^2]^{1/2}]\sin[knz[[1-(NA\rho/n)^2]^{1/2}-1]]d\rho,$$

where $J_0$ is the zeroth-order Bessel function of the first kind, $k=1\pi/\lambda$, $\lambda$ is the wavelength of illumination of the bright field microscope, NA is the numerical aperture of objective lens of the bright field microscope, n is the index of refraction of the medium between the objective lens of the bright field microscope, the coverslip, (x,y) are transversal image coordinates, z is the amount of defocusing, ρ is the variable of integration and dρ is the differential of the variable ρ.

6. The method according to claim 1, wherein said sample phase object comprises prokaryotic cells, eukaryotic cells, archaea cells, polymers, biological polymers, biofilms or transparent thin layer samples.

7. The method according to claim 1, wherein the z-stack of background-free bright field images comprises recording with a bright field microscope a set of background-free images at various amounts of defocusing.

8. The method according to claim 4, wherein standard methods include fluorescence microscopy and histochemistry.

9. A quantitative image restoration in bright field microscopy method, the method comprising:
   a) acquiring a single out-of-focus background-free bright field image of a sample phase object, wherein said sample phase object is unstained;
   b) calculating, a bright field theoretical phase point spread function at the same amount of defocus that said background-free bright field image, considering a specific description of the bright field microscope and the optical sample characteristic;
   c) producing a quantitative restored bright field image by applying a two-dimensional deconvolution routine using said bright field theoretical phase point spread unction and the out-of-focus background-free bright field image of the sample phase object;
   d) applying an intensity threshold to the quantitative restored bright field images generated in step (c); and
   e) performing quantitative measurements of morphology of said sample phase object.

10. The method according to claim 9, wherein said specific description of the bright field microscope comprises: numerical aperture of the objective lens of the microscope and the wavelength of illumination of the microscope.

11. The method according to claim 9, wherein said optic sample characteristic is the index of refraction of the medium between the objective lens of the microscope and the coverslip.

12. The method according to claim 9, wherein the two-dimensional deconvolution routine provides an image of said sample phase object with a well-defined boundary that matches a boundary detected by methods that require sample staining.

13. The method according to claim 9, wherein said bright field theoretical phase point spread function (pPSF(x,y,z), is defined by:

$$pPSF(x,y,z) = \int_0^1 J_0[kNA\rho[x^2+y^2]^{1/2}]\sin[knz[[1-(NA\rho/n)^2]^{1/2}-1]]d\rho,$$

where $J_0$ is the zeroth-order Bessel function of the first kind, k=2π/λ, λ is the wavelength of illumination of the bright field microscope, NA is the numerical aperture of the objective lens of the bright field microscope, n is the index of refraction of the medium between the objective lens of the bright field microscope and the coverslip, (x,y) are transversal image coordinates, z is the amount of defocusing, ρ is the variable of integration and dρ is the differential of the variable ρ.

14. The method according to claim 9, wherein the two-dimensional deconvolution is carried out using the corresponding pPSF image at the same amount of defocus of said out-of-focus background-free bright field image.

15. The method according to claim 9, wherein said step (d) further comprises comparing other microscope generated images with deconvolved cell images in order to calculate said threshold.

16. The method according to claim 15, wherein said microscope generated images are fluorescence microscope generated images.

17. The method according to claim 9, wherein said quantitative measurements are derived from step (d), and are further processed by an image segmentation algorithm.

18. The method according to claim 9, wherein said phase object comprises prokaryotic cells, eukaryotic cells, archaea cells, polymers, biological polymers, biofilms or transparent thin layer samples.

19. The method according to claim 12, wherein standard methods include fluorescence microscopy and histochemistry.

* * * * *